United States Patent
Synnott et al.

(10) Patent No.: US 10,533,433 B2
(45) Date of Patent: Jan. 14, 2020

(54) TURBINE BLADE WITH HOT-CORROSION-RESISTANT COATING

(71) Applicant: PRATT & WHITNEY CANADA CORP., Longueuil (CA)

(72) Inventors: Remy Synnott, St-Jean-sur-Richelieu (CA); Yulia Panchenko, Montreal (CA); Andrzej Paczoski, Lachine (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 483 days.

(21) Appl. No.: 15/220,765

(22) Filed: Jul. 27, 2016

(65) Prior Publication Data
US 2017/0030203 A1    Feb. 2, 2017

Related U.S. Application Data

(60) Provisional application No. 62/197,348, filed on Jul. 27, 2015.

(51) Int. Cl.

| F01D 5/28 | (2006.01) |
|---|---|
| C23C 4/01 | (2016.01) |
| C23C 24/08 | (2006.01) |
| C23C 24/04 | (2006.01) |
| C23C 4/18 | (2006.01) |
| C23C 4/08 | (2016.01) |

(Continued)

(52) U.S. Cl.
CPC .............. *F01D 5/288* (2013.01); *C23F 11/08* (2013.01); *F01D 5/141* (2013.01); *F05D 2220/32* (2013.01); *F05D 2230/90* (2013.01); *F05D 2240/303* (2013.01); *F05D 2260/95* (2013.01); *F05D 2300/11* (2013.01); *F05D 2300/132* (2013.01)

(58) Field of Classification Search
CPC . F01D 5/288; F01D 5/286; C23C 4/01; C23C 4/08; C23C 4/18; C23C 24/04; C23C 24/087; C23F 11/08
See application file for complete search history.

(56) References Cited

U.S. PATENT DOCUMENTS

| 4,576,874 A | * | 3/1986 | Spengler .................. C23C 4/02 427/454 |
|---|---|---|---|
| 6,095,755 A | | 8/2000 | Houston |
| 6,364,608 B1 | | 4/2002 | Brainch et al. |

(Continued)

OTHER PUBLICATIONS

Eliaz et al, Hot corrosion in gas turbine components, 2002, Elservier Science Ltd., Engineering Failure Analysis 9 (2002) 31-43 (Year: 2002).*

(Continued)

*Primary Examiner* — Jason D Shanske
*Assistant Examiner* — John S Hunter, Jr.
(74) *Attorney, Agent, or Firm* — Norton Rose Fulbright Canada LLP

(57) ABSTRACT

A turbine blade of a gas turbine engine is described which includes an airfoil extending away from the hub platform to a blade tip. The airfoil defines a leading edge, a trailing edge, and a span-wise length extending between the platform and the blade tip. A hot-corrosion-resistant coating is located on the leading edge of the airfoil within a radially inner portion thereof, the radially inner portion extending away from the hub platform a desired distance along the span-wise length.

18 Claims, 5 Drawing Sheets

(51) Int. Cl.
*C23F 11/08* (2006.01)
*F01D 5/14* (2006.01)

(56) References Cited

U.S. PATENT DOCUMENTS

| | | |
|---|---|---|
| 7,597,934 B2 | 10/2009 | Nagaraj et al. |
| 7,993,759 B2 | 8/2011 | Nagaraj et al. |
| 8,596,985 B2 | 12/2013 | Walker et al. |
| 2004/0163583 A1 | 8/2004 | Khan et al. |
| 2011/0052406 A1 | 3/2011 | Bruce et al. |
| 2015/0197841 A1 | 7/2015 | Tang et al. |

OTHER PUBLICATIONS

Fisher et al, "Noble Metal Aluminide Coatings for Gas Turbines", Platinum Metals Rev., 1999, 43, (2), 59-61.

* cited by examiner

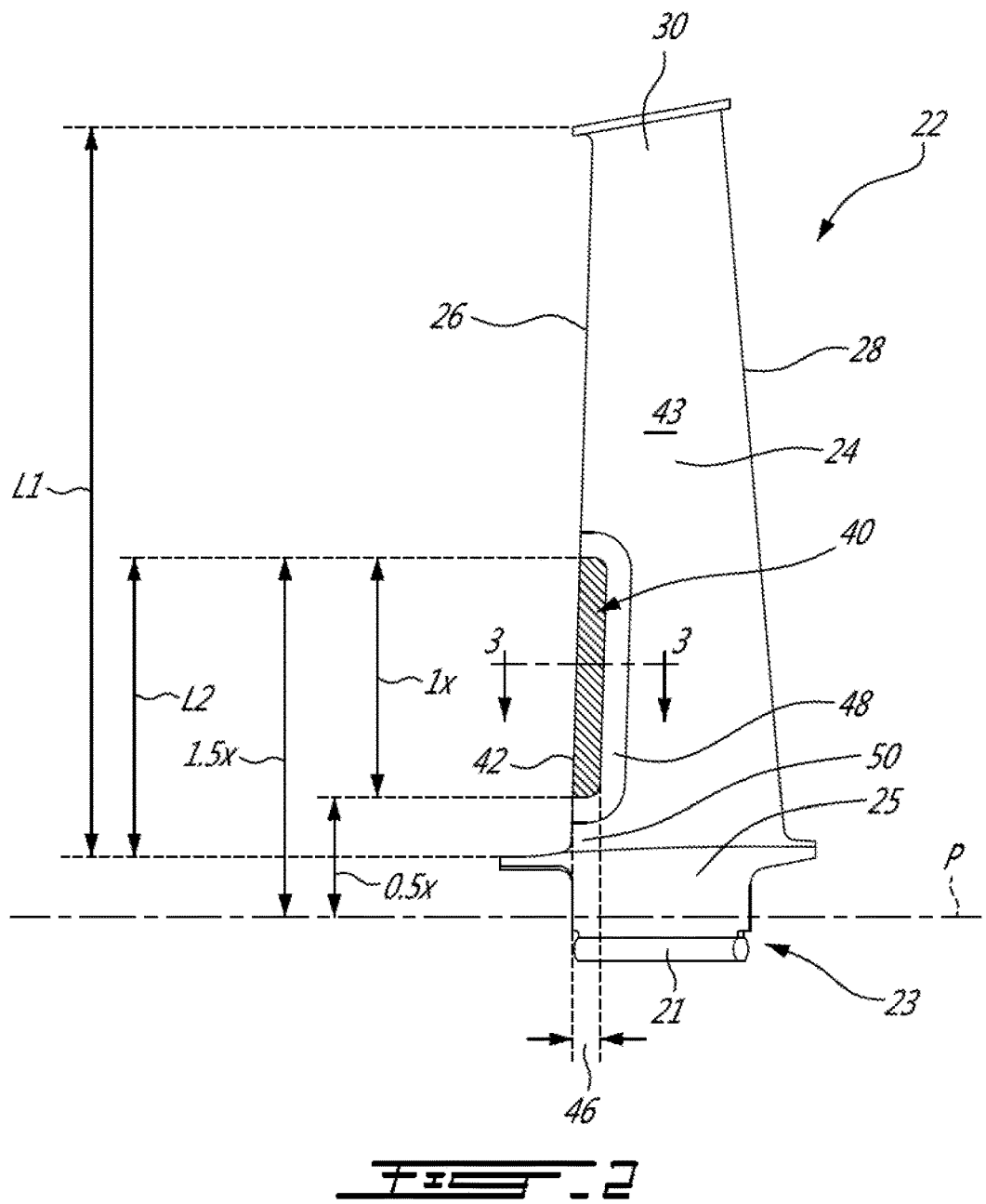
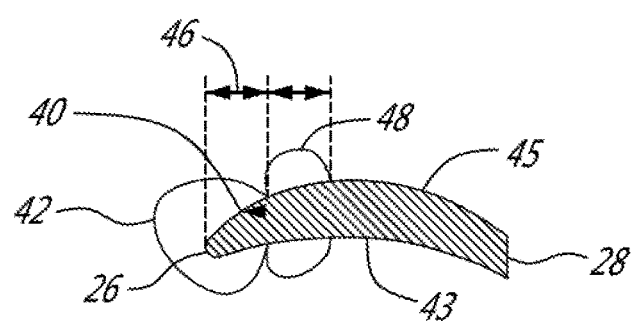

TURBINE BLADE WITH HOT-CORROSION-RESISTANT COATING

TECHNICAL FIELD

The application relates generally to gas turbine engines and, more particularly, to turbine blades thereof.

BACKGROUND

Gas turbine engine turbine blades are exposed to high temperatures and can experience excessive wear in certain operating conditions. In some cases, this wear has been known to result in fractures occurring in the blades. One cause of such excessive wear is hot-corrosion.

Hot-corrosion, sometimes called "sulphidation", is a phenomenon whereby accelerated degradation of the turbine blade occurs. This may be caused by the operating conditions to which the components are exposed, environmental impurities on the metal surface, or a combination of these and other factors. Regardless, the result can be a rapid degradation of the underlying alloy of the metal turbine blade.

Attempts have been made to minimize the effect of hot-corrosion through the application of protective coatings. It is known, for example, to apply a protective coating made of platinum aluminide on the entire exterior surface of the airfoil. Typically, such a platinum aluminide coating is applied by diffusion to all external and internal surfaces of the airfoil. However, the added weight caused by this coating (due to the density of the aluminide material and/or the thickness of this coating that is required, and its application over the entire airfoil) subjects the turbine blades to increased stresses, which can further reduce the lifespan of the part. This is undesirable.

Accordingly, there exists a need for an improved turbine blade and a method of protecting such turbine blades from hot-corrosion.

SUMMARY

There is therefore provided a turbine blade of a gas turbine engine comprising: an airfoil extending from a hub platform of a blade root to a blade tip, the airfoil defining a leading edge, a trailing edge, a pressure side surface and a suction side surface, the airfoil defining a span-wise length between the hub platform and the blade tip; and a hot-corrosion-resistant coating disposed on a region of the airfoil, the region including the leading edge and extending downstream from the leading edge a partial cord-wise distance on the suction side surface and on the pressure side surface of the airfoil, the region being disposed exclusively within a radially inner half of the span-wise length of the airfoil, the radially inner half extending from the hub platform to a mid-span point of the airfoil.

There is also provided a method of protecting a turbine airfoil of a gas turbine engine, the method comprising the steps of: determining an expected operational temperature profile of the turbine airfoil; determining, based on the expected operational temperature profile, an area of the turbine blade most susceptible, in use, to hot-corrosion; and applying a hot-corrosion-resistant coating exclusively to the area most susceptible to hot-corrosion.

In accordance with an alternate aspect, there is provided a turbine blade of a gas turbine engine comprising: a root located beneath a hub platform, and an airfoil extending away from the hub platform to a blade tip, the airfoil defining a leading edge, a trailing edge, and a span-wise length extending between the platform and the blade tip; and a hot-corrosion-resistant coating disposed on the leading edge of the airfoil only within a radially inner portion thereof, the radially inner portion extending away from the hub platform a distance less than half of said span-wise length.

In accordance with another alternative aspect, there is provided a method of protecting a turbine blade of a gas turbine engine having a blade root and an airfoil extending therefrom, the method comprising: determining a temperature profile of the turbine blade; determining, based on the temperature profile, an area of the turbine blade susceptible to hot-corrosion; and applying a hot-corrosion-resistant coating to the area susceptible to hot-corrosion.

BRIEF DESCRIPTION OF THE DRAWINGS

Reference is now made to the accompanying figures in which:

FIG. 2 is a side elevational view of a turbine blade of the gas turbine engine of FIG. 1, in accordance with one aspect of the present disclosure;

FIG. 3 is a cross-sectional view of the turbine blade of FIG. 2, taken through section line 3-3 of FIG. 2.

DETAILED DESCRIPTION

Figure 1:
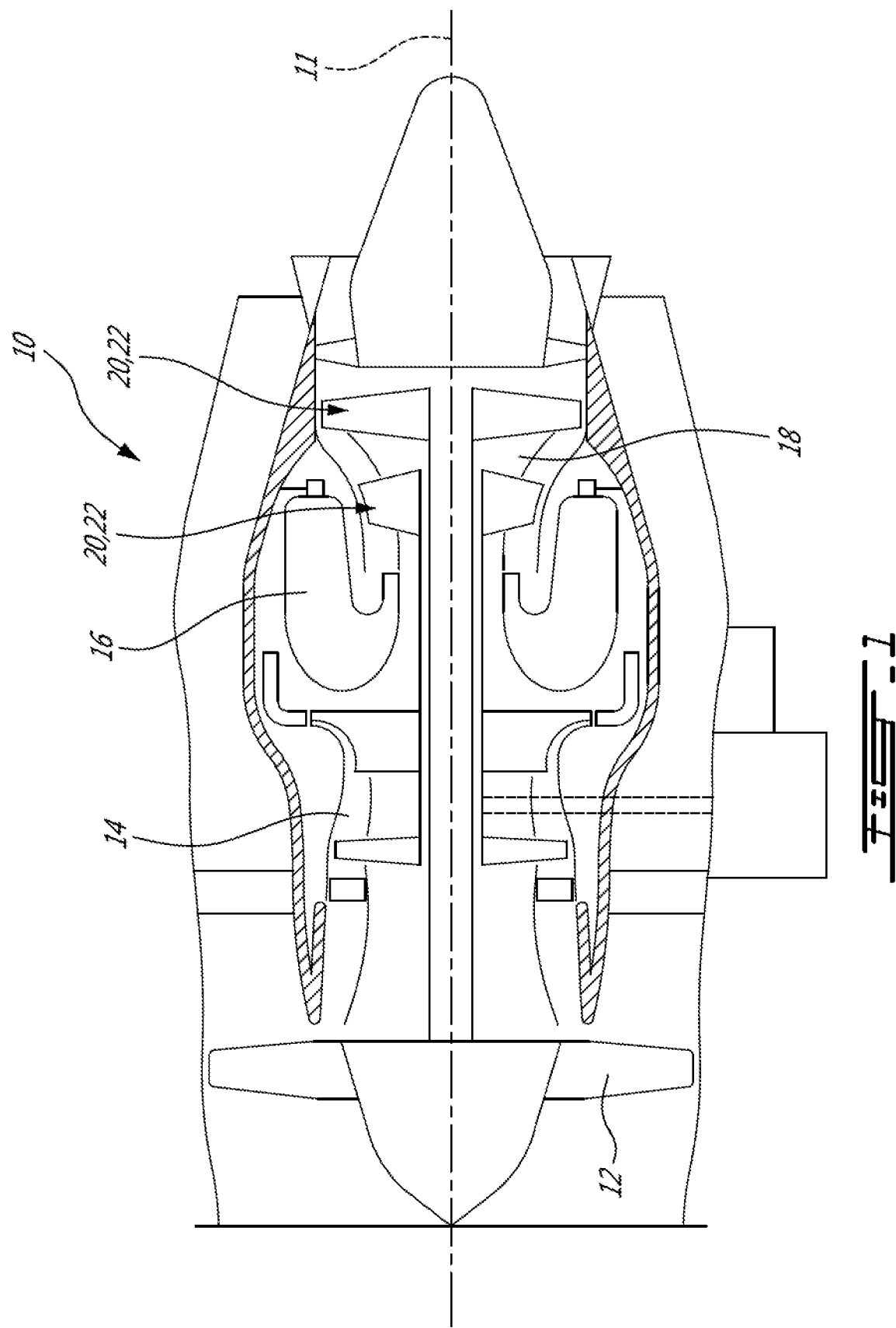
FIG. 1 is a schematic cross-sectional view of a gas turbine engine according to the present description.

FIG. 1 illustrates a gas turbine engine 10, generally comprising in serial flow communication, a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The gas turbine engine 10 defines a longitudinal central axis 11.

The turbine section 18 includes at least one, but generally a plurality of, turbine rotors 20. The turbine rotors 20 each comprise an annular hub or disk (not shown) and a plurality of circumferentially-disposed turbine blades 22 extending therefrom. The turbine blades 22 extend radially relative to the longitudinal central axis 11 which additionally defines a central axis of rotation of the turbine rotors 20.

Referring to FIG. 2, each turbine blade 22 has a root portion 23 including a hub platform 25, and an airfoil 24 extending outwardly away from the hub platform 25 of the root. More particularly, the root portion 23 extends in a first (inner) radial direction from the hub platform 25 and the airfoil extends from the hub platform in a second (outer) radial direction. Typically, the root portion 23, hub platform 25 and airfoil 24 are integrally formed together to form a one-piece turbine blade 22. The root portion 23 may have one or more sets of opposing lobes 21 that project from the lateral side sides of the root portion 23 to form a dovetail or firtree shaped root contour adapted to be received within correspondingly-shaped firtree slots in the annular hub or disk of the turbine rotor 20. The airfoil 24 of the turbine blade 22 is adapted to extend into the turbine gas path accommodating the annular stream of hot combustion gases generated by the combustor 16, the hot combustion gases acting on the airfoil 24 of the turbine blades 22 and causing the turbine rotor 20 to rotate.

The turbine blades 22 described herein may be un-cooled, i.e. substantially free of cooling air passages extending therethrough. However, it is understood that other types of turbine blades and/or gas turbine engine airfoils can be similarly provided with a protective coating as described herein.

Referring still to FIG. 2, the airfoil 24 of the turbine blade 22 includes a leading edge 26 and a trailing edge 28, the trailing edge 28 being positioned further aft longitudinally than the leading edge 26. The airfoil 24 extends in a radial, or span-wise, direction from the platform portion 25 to the blade tip 30, which is located at an outer radial end of the airfoil 24. More particularly, the airfoil 24 has a span-wise length L1 defined between the hub platform 25, on a radially inner end, and the blade tip 30, at a radially outer end.

As best seen in FIG. 3, the airfoil 24 of the turbine blade 22 may be cambered (i.e. curved camber line) as is typical in the art of turbine blade airfoils. The turbine blade depicted is uncooled (i.e. no internal passageways through which secondary cooling air is circulated), and is thus solid throughout. These intentionally uncooled airfoils, however, generally operate at temperatures in which the airfoils are subject to extreme degrees of hot-corrosion. The term "hot-corrosion" will be used herein, and is understood to be equivalent to "sulphidation". As such, the terms "hot-corrosion-resistant", or "sulphidation-resistant", are understood to mean "resistant to hot-corrosion".

Figure 4:
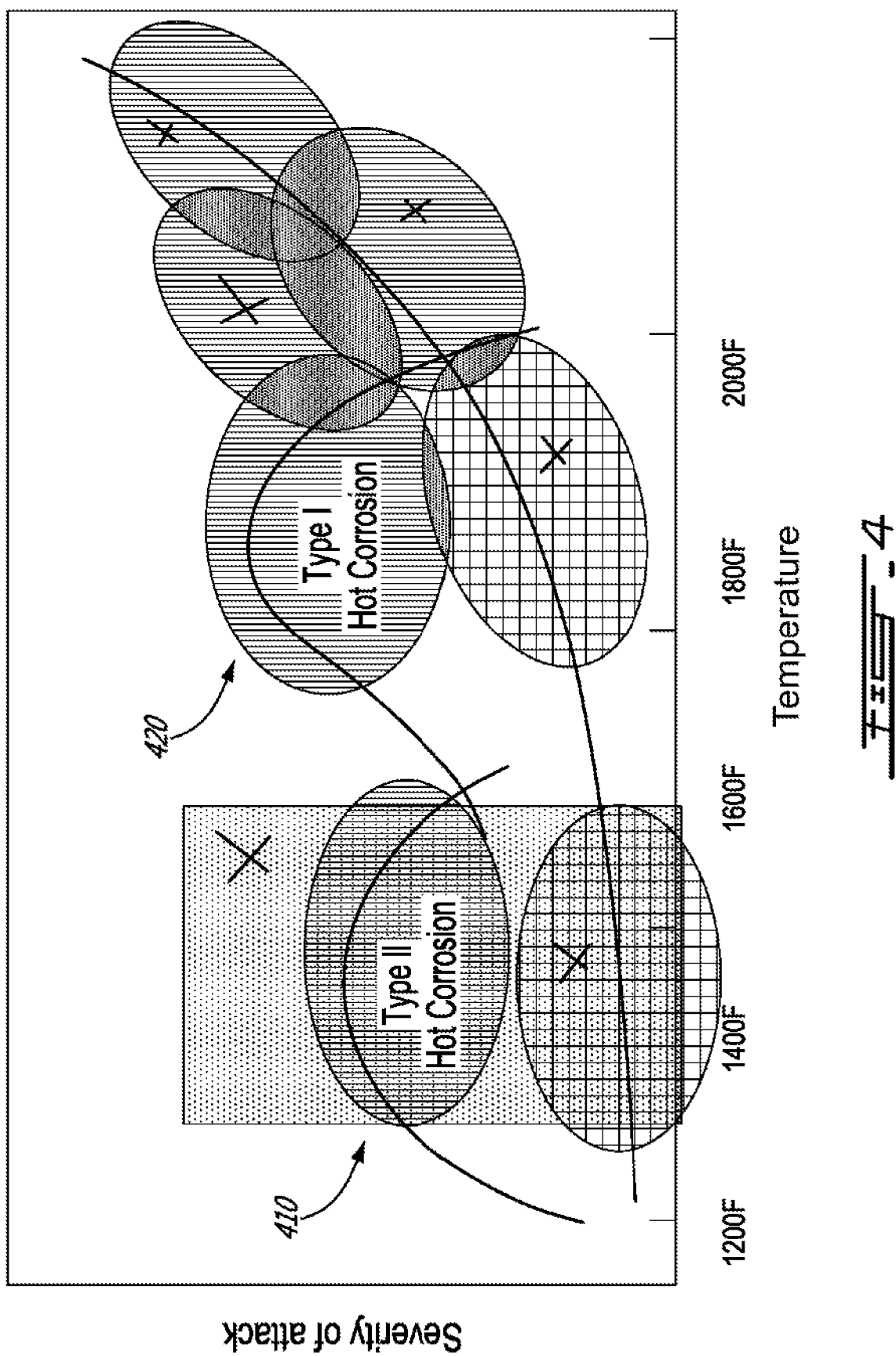
FIG. 4 is a graph depicting temperature regions where different types of corrosive attacks may take place, plotting temperature against severity of attack.

With reference to FIG. 4, and as mentioned above, hot-corrosion is essentially accelerated degradation which occurs at temperatures within at least one relatively narrow temperature band. Environmental impurities on the metal airfoil surface, such as sulfur, sodium, vanadium and related compounds, such as sodium sulfate, sodium chloride and vanadium pentoxide, may be contributors to hot-corrosion. The presence of these impurities on the surface of metal alloys can prevent the formation of a protective oxide layer, which would normally form in the absence of such impurities. Instead, the impurities may act as a flux which disrupts any oxide layer that would normally form on the surface, and this lack of a protective oxide layer permits diffusion of corrodents (i.e. corrosive matter) through the fluxed surface layer which can then result in undesirable direct and rapid degradation of the underlying alloy of the airfoil. The operating conditions (including temperature and environmental conditions) of the engine 10 and thus the airfoils 24, may also contribute to the occurrence of hot-corrosion.

FIG. 4 is a graphical illustration of temperature regions where different types of corrosive attacks may take place, plotting temperature against severity of attack. Airfoil surfaces may be especially sensitive to hot-corrosion in two specific temperature regions, namely temperature regions 410, 420. Temperatures in the first temperature region 410, centred at approximately 1450 F and spanning approximately 1300 F to 1600 F, may expose the airfoil surfaces to so-called Type II Hot-Corrosion. Similarly, temperatures in the second (higher) temperature region 420, centered at approximately 1850 F and spanning approximately 1750 F to 1950 F, may expose airfoil surfaces to so-called Type I Hot-Corrosion.

Although it is typically understood that it is the blade tips 30 of turbine blades 22 which are exposed to the highest temperatures (the radial temperature profile of the gas flowing through the turbine rotor 20 is not uniform), it has been found that it may be the inner half (i.e. from hub to mid-span) of the airfoils 24 of the turbine blades 22, which experience relative lower temperatures than the blade tips 30, that are most prone to damage by hot-corrosion.

Figure 5:
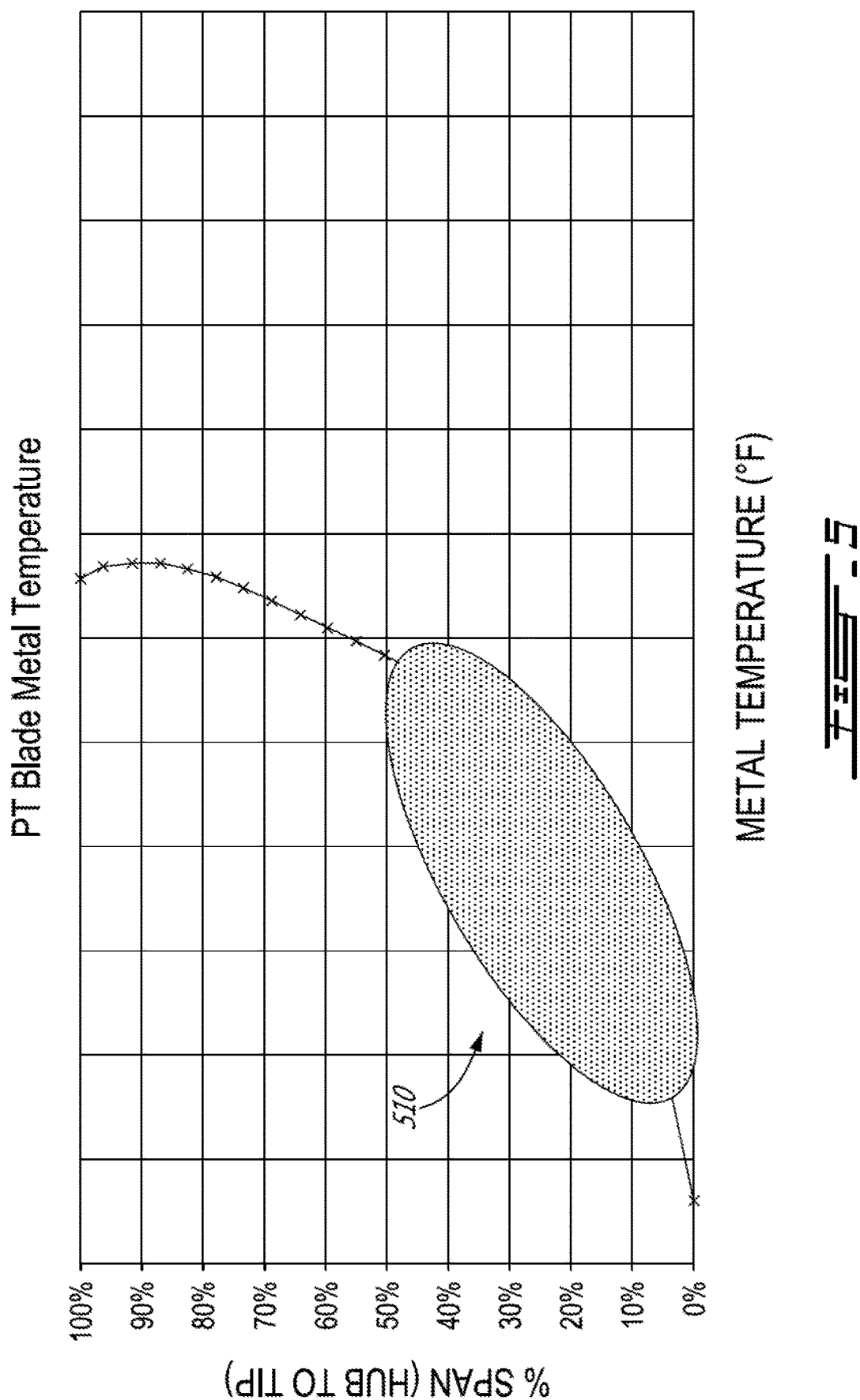
FIG. 5 is a graph plotting temperature against relative airfoil surface span.

With reference to FIG. 5, there is shown a graphical illustration plotting temperature against relative airfoil surface span. Hot-corrosion is believed to occur in the vicinity of the inner half of airfoil total span because the relatively lower temperatures to which the radially inner half of the blades 22 are exposed fall within the specific temperature band (discussed supra) required for hot-corrosion to occur, and shown here as region 510. The other factor believed to be required for hot-corrosion to occur is high content of sulfur or other chemicals—caused, for example, by ash or salt in the air that is injected by the gas turbine engine, which may be particularly present when flying over bodies of water, volcanoes, forest fires, and the like.

Accordingly, the application of the present hot-corrosion resistance coating 40 has been limited only to the inner half (L2) of the total span-wise length (L1) of the turbine blade 22, and only on the leading edge 26 within this radially inner span-half region, as is described in greater detail below.

Referring now to FIGS. 2 and 3, the application of a corrosion-resistant coating 40 made of a high-chromium content material only to a specific and limited portion of the airfoil 24 may be used to minimize the occurrence of hot-corrosion of the turbine blade 22. The application of the coating 40 to only the limited portion of the airfoil 24 may additionally avoid at least some of the drawbacks associated with known coatings, such as platinum aluminide, which are typically applied to the entirety of the airfoil.

Accordingly, the airfoil 24 has a hot-corrosion-resistant coating 40 applied only to a partial region of the airfoil (i.e. the coating 40 does not cover the entirety of the airfoil 24). This partial region 42 having the hot-corrosion-resistant coating 40 thereon includes at least the leading edge 26 of the airfoil 24, and extends downstream from the leading edge 26 a partial cord-wise distance 46 on both the suction side surface 45 and the pressure side surface 43 of the airfoil 24, but only within a span-wise radially inner half of the airfoil 24. This radially inner half of the airfoil is disposed between the hub platform 25 of the blade root 23 and mid-span point of the airfoil 24. Accordingly, the region 42 having the coating 40 thereon extends a majority of the radially inner portion of the total span-wise length, and more particularly, as shown in FIG. 2, extends a span-wise distance L2 that is less than half of the entire span-wise length L1 of the airfoil in total span-wise length and disposed within the radially inner half of the airfoil. The hot-corrosion-resistant coating 40 is therefore disposed on the airfoil 24 exclusively within the radially inner half of the span-wise length (i.e. extends at most from hub to mid-span) of the total span-wise length of the leading edge 26.

With respect to span-wise coverage of the coating 40, therefore, in one particular embodiment the portion 42 of the airfoil 24 having the coating 40 therein extends in a span-wise direction of 1×, wherein the coated portion 42 begins at a span-wise distance of 0.5× from a reference plane P, extending through a span-wise center of the blade root 23, and ends at a span-wise distance of 1.5× from the reference plane P. In all cases, however, the coated portion 42 of the airfoil 24 remains within the radially inner span-wise half (from hub to mid-span) of the total span-wise length of the airfoil. Accordingly, as seen in FIG. 2, the coating 40 may not extend radially inwardly all the way to the hub platform 25, thereby leaving a small zone 50 of bare metal that remains uncoated immediately radially outward from the hub platform 25. In one specific embodiment, in the span-wise lengths provided above, x=1 and the distances are provided in inches.

With respect to cord-wise coverage of the coating 40 on the airfoil, as seen in FIGS. 2-3, the coating 40 is applied to a region of the airfoil including the leading edge 26 within the portion 42 thereof, such that the coating 40 covers at least the leading edge 26 within this region 42. The coating 40 extends only a partial axial distance 46 (chord-wise) downstream from the extreme leading edge 26 on both the pressure side 43 and the suction side 45 of the airfoil 24. A certain amount of tolerance may be accepted around the portion 42 within which the coating 40 is applied, as represented by the "overspray" zone 48 depicted in FIGS. 2 and 3, within which overspray of the coating may be acceptable. This cord-wise coverage of the coating 40 is however understood to be minimal relative to the overall cord-wise width of the airfoil 24. The coated portion 42 on the airfoil 24 may therefore extend in a cord-wise direction, on both the pressure side surface 43 and the suction side surface 45 of the airfoil, a chord-wise distance that is less than the total chord-wise width of the airfoil (i.e. a partial chord-wise distance). This chord-wise distance that the region extends downstream from the leading edge, on both the pressure and suction side surfaces, may be the same on both sides (i.e. it is a common chord-wise distance on both the pressure and suction sides). The chord-wise distance that the region extends downstream of the leading edge may also be at least less than 0.5 of the total cord-wise width of the airfoil, and more particularly less than about 0.25 of the total cord-wise width of the airfoil. In one specific embodiment, the partial cord-wise distance 46 may only be about 0.100 inches, with an additional allowance of 0.100 inches for the overspray zone 48 (for a total possible cord-wise coverage distance of 0.200 inches maximum on each of the pressure and suction side surfaces 43 and 45).

The hot-corrosion-resistant coating 40 may be formed by applying a slurry to the airfoil. The resulting hot-corrosion-resistant coating 40 is composed of a high chromium content material, which is defined herein as a composition having a minimum chromium content of 20% (i.e. the coating is composed of at least 20% chromium, by weight). In some embodiments, the composition has a minimum chromium content of 25%, whereas in other embodiments the minimum chromium coating may be 30%, or any other suitable amount of chromium. Additionally, the coating 40 may have a maximum iron content of 3%, though in other embodiments the maximum iron content may be 2.5%, 2%, or any other suitable amount of iron. The remainder of the coating composition may consist primarily of base metal elements originating from the superalloy of the part being coated, which may mix with the slurry during application—this may result in the coating composition comprising upwards of 60% nickel.

Such a coating may include for example high temperature alloys, such as chromide based alloys. The hot-corrosion-resistant coating 40 may also have a weight less than that of platinum aluminide. This may be possible at least in part because the coating 40 as described herein may be more thinly applied than platinum aluminide and/or because the weight of the corrosion-resistant coating 40 is less than that of a platinum aluminide coating of the same quantity (i.e., the density of the corrosion-resistant coating 40 is less than that of platinum aluminide).

In at least one exemplary embodiment, for example, the coating 40 is applied as a layer having a thickness of between 0.0006" and 0.0013" (i.e. the maximum coating thickness required/employed is 0.0013"), though other thicknesses may also be considered suitable. Generally speaking, the thickness of the coating 40 may be thinner than a standard coating thickness typically used for platinum aluminide, which may range between 0.002" to 0.0035".

Accordingly, by applying the protective coating 40 only within region 42 of the leading edge 62, rather than over the entirety of the airfoil 24 and by employing a coating composed of a high chromium content material having a weight lower than that of a platinum aluminide coating, hot-corrosion resistance of the turbine blade 22 may be increased over that of a corresponding but uncoated blade composed of bare metal (e.g. Inconel 713), without unduly negatively affecting low cycle fatigue (LCF), high cycle fatigue (HCF), creep, etc.

Furthermore, while platinum aluminide coated blades are known to reduce LCF life relative to an uncoated blade, the blade 22 having a protective coating 40 thereon as described herein may not significantly reduce LCF life at all. This may accordingly provide non-trivial improvements in terms of increased lifespan and improved durability of the turbine blades 22 of the present disclosure.

Additionally, the protective coating 40 can be applied in much thinner layers than those platinum aluminide coatings, thereby further reducing weight and stress penalties associated with known platinum aluminide coatings. The high chromium content protective coating 40 also provides cost benefits compared to platinum aluminide coatings.

There is also provided a method of protecting a turbine blade of a gas turbine engine. While the steps described herein are presented in a particular order, it should be understood that the steps may occur in an order different than that which is presented herein. Moreover, the method may comprise additional steps, or may omit certain steps presented herein. Additionally, it should be noted that the method described herein may be applied to turbine blades which are newly manufactured and yet unsold, as well as to "used" turbine blades which are in a gas turbine engine which has already been sold to an end-user. In this way, the method described herein may be used as preventative maintenance in order to prevent hot-corrosion from damaging turbine blades of gas turbine engines already in service.

Figure 6:
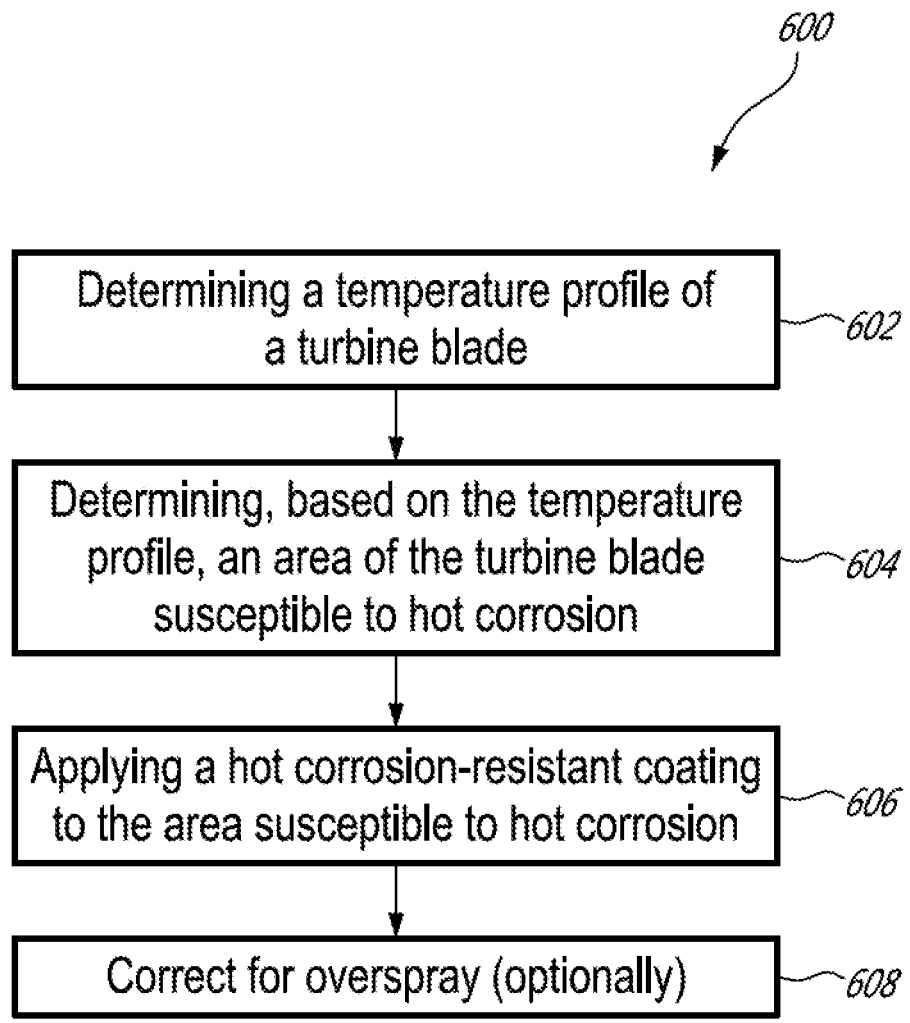
FIG. 6 is a flow diagram of a method of protecting a turbine blade from hot-corrosion, in accordance with one aspect of the method as described herein.

With reference to FIG. 6, the method 600 comprises a step 602 of determining a temperature profile of a turbine blade 22. The turbine blade 22 may be any suitable turbine blade 22 as disclosed herein: as such, the turbine blade 22 may be cambered or non-cambered, may or may not comprise cooling air passages which extend throughout the turbine blade, and the like. The temperature profile of the turbine blade 22 is a representation of the operating temperature of the metal of the turbine blade 22 at different points along the length of the blade. Determining the temperature profile of the turbine blade 22 may be performed in a number of different ways, including by computer simulation, by testing, based on known temperature profile templates for turbine blades 22 of similar build operating in similar conditions, or using any other suitable method.

The method 600 further comprises a step 604 determining, based on the temperature profile, an area of the turbine blade susceptible to hot-corrosion. As discussed supra, turbine blade 22 airfoil surfaces may be especially sensitive to hot-corrosion in two temperature regions, namely temperature regions 410, 420. Based on the temperature profile, it can be determined which area(s) of the turbine blade 22 are most susceptible to hot-corrosion. This determination may result in only one region of the turbine blade 22 being found to be susceptible to hot-corrosion, or may find multiple regions of the turbine blade 22 to be susceptible to hot-corrosion. In the latter case, these regions may be located substantially contiguously on the turbine blade 22, or may be isolated from one another.

The method further comprises a step 606 of applying a hot-corrosion-resistant coating 40 only to the area found to be susceptible to hot-corrosion, as determined in step 604. In some cases, the area found to be susceptible to hot-corrosion may be a radially inner portion 42 of a leading edge 26 of the airfoil, the radially inner portion 26 extending away from the root portion 23 a distance less than half of a span-wise length L1 of the airfoil 24, as is described supra. The hot-corrosion-resistant 40 coating may be composed of any suitable hot-corrosion-resistant coating described herein, which may include a minimum chromium content, such as 20% chromium, a maximum iron content, such as 3% iron, or may be any suitable composition.

The hot-corrosion-resistant coating 40 may be applied in any suitable fashion, including cold spraying, plasma spraying, chemical vapour deposition, physical vapour deposition, plating, spin coating, brushing, swabbing, dip coating, or via any other suitable method. Additionally, the hot-corrosion-resistant coating 40 may be applied to a plurality of turbine blades 22 simultaneously, or may be applied to a single individual turbine blade 22 at a time.

As an optional step, the method 600 may comprise a step 608 of correcting for overspray, which refers to the presence of the hot-corrosion-resistant coating 40 in the overspray zone 48. This may include, for example, applying a solvent or chemical to remove the excess hot-corrosion-resistant coating 40. In order to prevent removal of the hot-corrosion-resistant coating 40 from the region 42, a mask or other protective covering (not pictured) may be overlain on the region 42, such that the chemical can only be applied to the overspray zone 48 for removing excess hot-corrosion-resistant coating 40. Alternatively, or in addition, the method 600 may correct for overspray by placing a mask or other protective covering prior to applying the hot-corrosion-resistant coating 40 in step 604, such that when the hot-corrosion-resistant coating 40 is applied, substantially only the region 42 is exposed to the hot-corrosion-resistant coating 40. Other methods for correcting for overspray, which may include preventing or reducing overspray, are also considered.

The above description is meant to be exemplary only, and one skilled in the art will recognize that changes may be made to the embodiments described without departing from the scope of the invention disclosed. Still other modifications which fall within the scope of the present invention will be apparent to those skilled in the art in light of a review of this disclosure, and such modifications are intended to fall within the appended claims.

The invention claimed is:

1. A turbine blade of a gas turbine engine comprising:
an airfoil extending from a hub platform of a blade root to a blade tip, the airfoil defining a leading edge, a trailing edge, a pressure side surface and a suction side surface, the airfoil defining a span-wise length between the hub platform and the blade tip, wherein a radially outer half of the span-wise length of the airfoil extends from a mid-span point of the airfoil to the blade tip; and
a hot-corrosion-resistant coating disposed on a region covering the leading edge of the airfoil and extending downstream from the leading edge on the suction side surface and on the pressure side surface of the airfoil, the region excluding: the trailing edge of the airfoil; a majority of the suction side surface and the pressure side surface of the airfoil upstream from the trailing edge; and the radially outer half of the span-wise length of the airfoil.

2. The turbine blade according to claim 1, wherein the region having said hot-corrosion-resistant coating thereon extends a majority of a radially inner half of the span-wise length, the radially inner half extending from the hub platform to the mid-span point of the airfoil.

3. The turbine blade according to claim 2, wherein the region extends span-wise entirely from the hub-platform to the mid-span point of the airfoil.

4. The turbine blade according to claim 1, wherein the region on the suction side surface and on the pressure side surface of the airfoil that the region extends downstream from the leading edge is less than half of a total cord-wise width of the airfoil.

5. The turbine blade according to claim 1, wherein the region on the suction side surface and on the pressure side surface of the airfoil is less than a quarter of a total cord-wise width of the airfoil.

6. The turbine blade according to claim 1, wherein the region extends downstream from the leading edge a common chord-wise distance on both the pressure side surface and the suction side surface.

7. The turbine blade according to claim 1, wherein the hot-corrosion-resistant coating is composed of a composition having a minimum chromium content of 20%.

8. The turbine blade according to claim 1, wherein the hot-corrosion-resistant coating is composed of a composition having a maximum iron content of 3%.

9. The turbine blade according to claim 1, wherein the hot-corrosion-resistant coating has a thickness of between 0.0006 inches and 0.0013 inches.

10. The turbine blade according to claim 1, wherein the density of the hot-corrosion-resistant coating is less than that of a platinum aluminide coating.

11. A method of protecting a turbine airfoil of a gas turbine engine, the method comprising the steps of:
determining an expected operational temperature profile of the turbine airfoil;
determining, based on the expected operational temperature profile, a region of the turbine airfoil susceptible, in use, to Type I and/or Type II hot-corrosion, the region consisting of the leading edge and extending downstream from the leading edge on the suction side surface and on the pressure side surface of the turbine airfoil, the region excluding the trailing edge of the airfoil, a majority of the cord-wise length of the suction side surface and the pressure side surface of the airfoil upstream from the trailing edge of the airfoil, and a radially outer half of the span-wise length of the airfoil, wherein the radially outer half extending from the blade tip to a mid-span point of the airfoil; and
applying a hot-corrosion-resistant coating exclusively to the region susceptible to Type I and/or Type II hot-corrosion.

12. The method of claim 11, wherein the region extends downstream from the leading edge on the suction side surface and on the pressure side surface of the turbine airfoil less than half of a total cord-wise width of the turbine airfoil.

13. The method of claim 12, wherein the region extends downstream from the leading edge on the suction side surface and on the pressure side surface of the turbine airfoil less than a quarter of the total cord-wise width of the turbine airfoil.

14. The method of claim 11, wherein the region extends downstream from the leading edge a common chord-wise distance on both the pressure side surface and the suction side surface.

15. The method of claim 11, wherein the region extends a majority of a radially inner half of the span-wise length, the radially inner half extending from the hub platform to the mid-span point of the airfoil.

16. The method of claim 15, wherein the region extends in the span-wise direction entirely from a hub-platform of a blade root of the turbine airfoil to the mid-span point of the turbine airfoil.

17. The method of claim 11, further comprising selecting the hot-corrosion-resistant coating to be a composition having a minimum chromium content of 20% and a maximum iron content of 3%.

18. The method of claim 11, further comprising applying the hot-corrosion-resistant coating in a thickness of between 0.0006 inches and 0.0013 inches.

* * * * *